US012327498B2

(12) United States Patent
Livingston et al.

(10) Patent No.: US 12,327,498 B2
(45) Date of Patent: Jun. 10, 2025

(54) SINGLE PLY PIGGYBACK LABEL

(71) Applicant: Iconex LLC, Duluth, GA (US)

(72) Inventors: Timothy Darren Livingston, Corryton, TN (US); James Kirby Price, Morristown, TN (US)

(73) Assignee: Iconex LLC, Duluth, GA (US)

( * ) Notice: Subject to any disclaimer, the term of this patent is extended or adjusted under 35 U.S.C. 154(b) by 0 days.

(21) Appl. No.: 18/457,192

(22) Filed: Aug. 28, 2023

(65) Prior Publication Data

US 2025/0078687 A1 Mar. 6, 2025

(51) Int. Cl.
*G09F 3/02* (2006.01)
*G09F 3/10* (2006.01)

(52) U.S. Cl.
CPC .............. *G09F 3/0288* (2013.01); *G09F 3/10* (2013.01); *G09F 2003/0225* (2013.01)

(58) Field of Classification Search
CPC . G09F 3/0288; G09F 3/02; G09F 3/10; G09F 2003/0225
USPC .......... 40/299.01, 638; 281/2, 5; 283/61, 62, 283/67, 70, 72, 81, 94, 98, 99, 100, 101, 283/103, 105
See application file for complete search history.

(56) References Cited

U.S. PATENT DOCUMENTS

2020/0180280 A1* 6/2020 Herranen .................. B32B 7/06
2022/0058984 A1* 2/2022 Ambartsoumian ... B65C 9/0006

* cited by examiner

*Primary Examiner* — Justin V Lewis
(74) *Attorney, Agent, or Firm* — Schwegman Lundberg & Woessner, P.A.

(57) ABSTRACT

A label combination for a single ply piggyback label is provided. The label combination includes a primary label with a silicone release patch disposed on a front side of the primary label. An adhesive coating is disposed on a backside of a removable label. The backside of removable label is disposed over the silicone release patch on the front side of the primary label to form the label combination.

10 Claims, 9 Drawing Sheets

SINGLE PLY PIGGYBACK LABEL

BACKGROUND

A piggyback label is a removable label defined within another primary label. The piggyback label is removed from the primary label after the primary label is adhered to a surface of an object. Often piggyback labels require three substrates, two liner substrates and a label substrate for the primary label and the removable label. The three substrates are believed necessary to provide sufficient structural support for label auto applications.

For example, a liner and face stock/label substrate that includes a single die cut for the removable label within the liner weakens the liner when the primary label is separated from the liner by leaving a hole in the liner waste that corresponds to the removable label. A portion of the liner remains attached to the back of the removable label when the primary label is separated from the liner with the removable label. The location and size of the holes cause jams in a printer/applicator rewinder, which rewinds the waste liner, because the liner was weakened by the liner holes and breaks. As a result, most piggyback labels include an extra liner substrate consisting of a first liner with no holes (i.e., a waste liner) and a second liner that is applied to a surface with the primary label adhered to the second liner. The removable label is then separated from primary label while the second liner remains adhered to the surface.

SUMMARY

In various embodiments, a single ply piggyback label and rolls of piggyback replacement labels are presented. In an embodiment, a method of manufacturing a roll of piggyback replacement labels is presented.

Specifically, and in an embodiment, a label combination is provided. The label combination includes a liner substrate (hereinafter just "liner"), a label substrate and a removable label substrate. A front side of the label substrate includes a silicone release patch corresponding in size and dimensions to the removable label substrate (herein after just "removable label"). A backside of the removable label includes an adhesive coating, and the removable label is placed over the silicone patch on the front side of the label substrate. The front side of the liner includes a release coating, and the backside of the label substrate includes an adhesive coating. The removable label representing a tip-on label on the front side of the label substrate and the label substrate represent a primary label.

When the liner is joined with the label substrate (hereinafter "primary label" to form the label combination and fed through an applicator for custom imaging/printing on a front side of the primary label and the front side of the removable label, the applicator separates the primary label from the liner and rewinds the liner as a waste liner. The waste liner includes no hole, which means the rewinding does not become off balance and does not jam. The applicator applies the primary label to a surface (e.g., a package). Once the primary label is adhered to the package, the removable label is separated from the primary label and applied to another surface or a different portion of the same surface to that which the primary label is adhered. The removable label separates from the primary label because of the silicone patch under the backside of the removable label. The silicone patch remains on the front side of the primary label and the backside of the removable label includes the original adhesive coating.

DETAILED DESCRIPTION

Figure 1A:
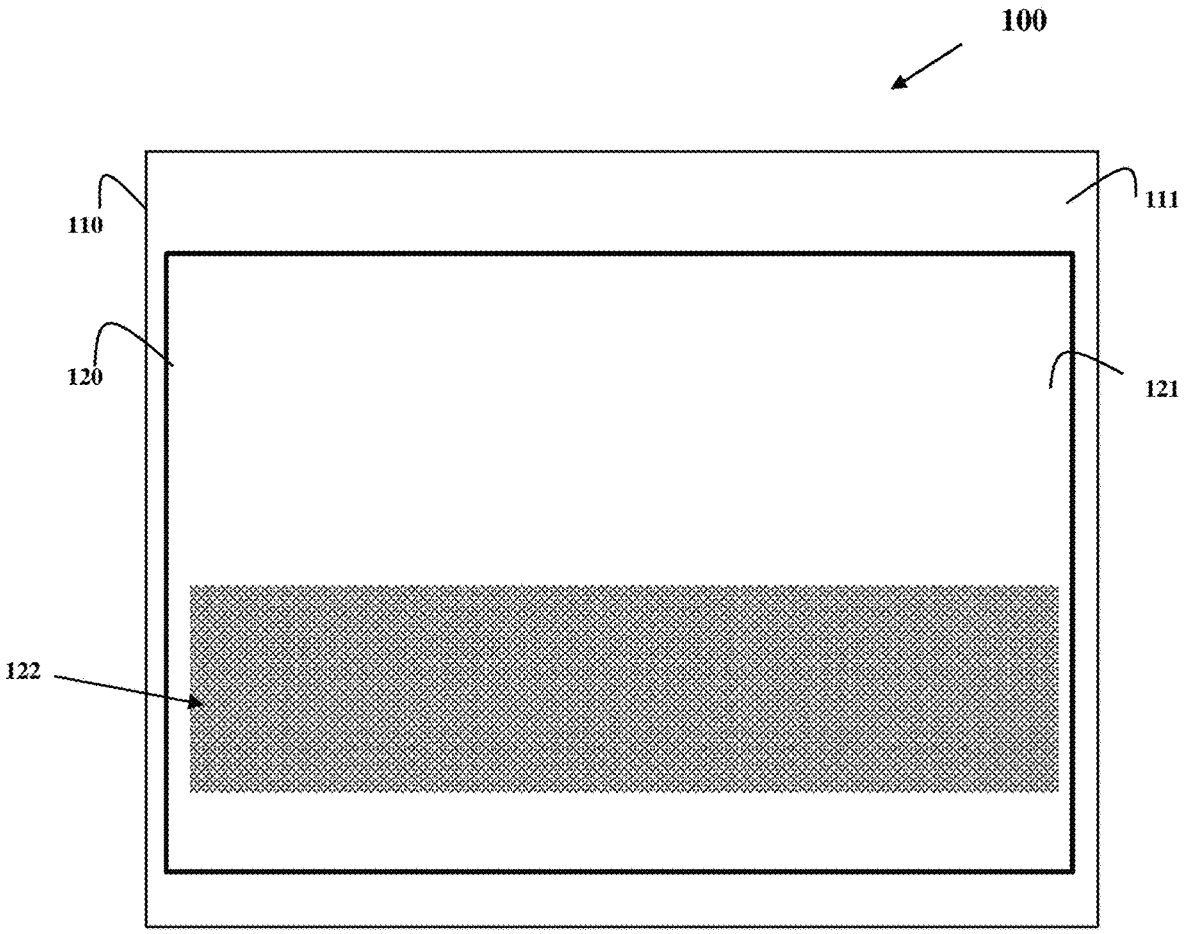
FIG. 1A is a diagram illustrating a front side of a label combination with a silicone patch for a single ply piggyback label, according to an example embodiment.

As used herein, the term and phrase "liner" and/or "liner substrate" may be used interchangeably and synonymously. Also, the phrases "face stock," "label substrate," and "primary label" may be used interchangeably and synonymously herein and below.

Piggyback labels are useful in a variety of industries for which a single label substrate includes two or more independent labels defined therein with at least one of the independent labels removable for independent application. Shippers often find piggyback labels useful for packages, with a primary label used to identify a shipping address and the removable label used to identify a return address. Of course, there are a variety of other application for which piggyback labels are useful.

Frequently, auto applicator printers/machines are used to apply the piggyback labels. A roll or web of the labels are fed into the auto applicator where the piggyback labels are custom imaged, separated from a liner, applied to a package or surface of an object, and the waste liner is rewound into a waste liner roll for disposal or recycling Use of a single liner has proved ineffective in the industry because the waste liner breaks and results in jams during rewinding within the auto applicator. Consequently, piggyback labels are manufactured with two liners along with extra adhesive coatings and release coatings needed because of the extra liner; this was discussed above.

These issues are solved with the single ply piggyback label, rolls of labels, and method of manufacturing a single ply piggyback label presented herein. A label combination includes a liner substrate ("liner") and a label substrate ("primary label"). A front side of the primary label includes a silicone release patch ("silicone patch") in size and dimensions that correspond to a removable label substrate ("removable label"). A backside of the removable label includes an adhesive coating. The backside of the removable label is aligned and placed over the silicone patch on the front side of the primary label. A backside of the primary label includes an adhesive coating, and a front side of the liner includes a release coating. The backside of the primary label is aligned and pressed against the front side of the liner to form the liner combination.

With this arrangement, the primary label can be auto applied to a surface by an auto applicator machine by peeling the primary label off the liner with no holes in the liner (i.e., waste liner once separated from the primary label). The waste liner without holes is balanced for rewinding by the auto applicator machine such that no jams occur and no breakage in the waste liner. The auto applicator machine applies the primary label to a surface. The removable label is separated from the primary label without any tearing or issue because of the silicone patch under the removable label on the front side of the primary label. The silicone patch remains on the primary label and the adhesive on the backside of the removable label remains such that the removable label can be applied or reapplied to a same or different surface from that which the primary label remains adhered to.

FIG. 1A is a diagram illustrating a front side of a label combination 100 with a silicone patch 122 for a single ply piggyback label (i.e., primary label) 120, according to an example embodiment. FIG. 1A illustrates a liner 110 and a primary label 120. A front side 111 of the liner 110 is illustrated along with a front side 121 of the primary label 120.

The front side 121 of the primary label 120 further includes a silicone patch 122. The silicone patch 122 is sized and has dimensions that correspond to a removable label 130 (illustrated in FIG. 1B).

Figure 1B:
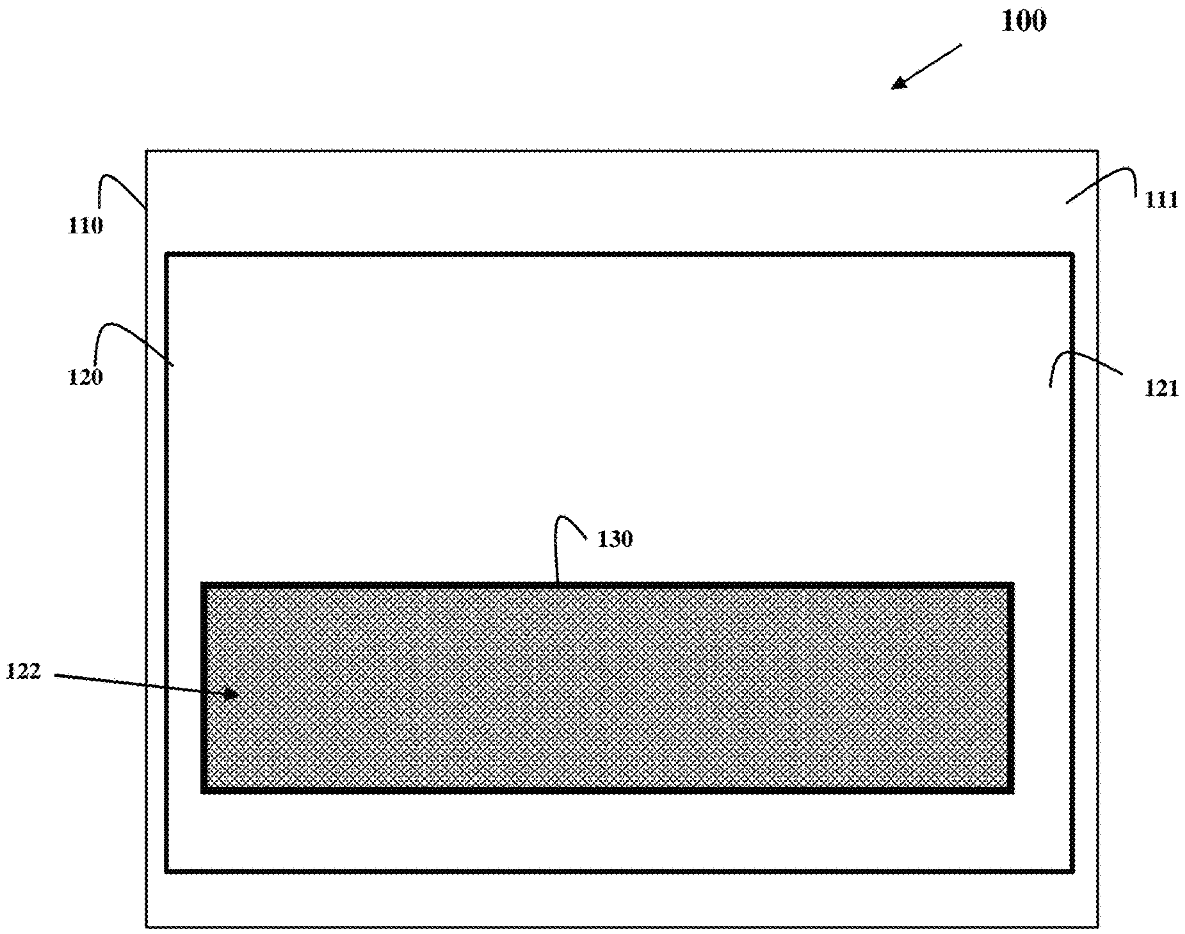
FIG. 1B is a diagram illustrating the front side of the label combination of FIG. 1A with a transparent view of a removable label applied to the front side over the silicone patch to form the single ply piggyback label, according to an example embodiment.

FIG. 1B is a diagram illustrating the front side of the label combination 100 of FIG. 1A with a transparent view of a removable label 130 applied to the front side 121 of the primary label 120 over the silicone patch 122 to form the single ply piggyback label (120, 122, and 130), according to an example embodiment.

Notably, and in an embodiment, there are no die cuts in the primary label 120 (i.e., the primary label 120 is without any die cuts) to define removable label 130 and to separate the removable label 130 from the primary label 120. Rather, the removable label 130 is a tip-on label and a separate substrate from the primary label 120. The removable label 130 is aligned and placed over the silicone patch 122. Additionally, the removable label 130 is removable from the primary label 120 without any liner 110 being required.

Figure 2:
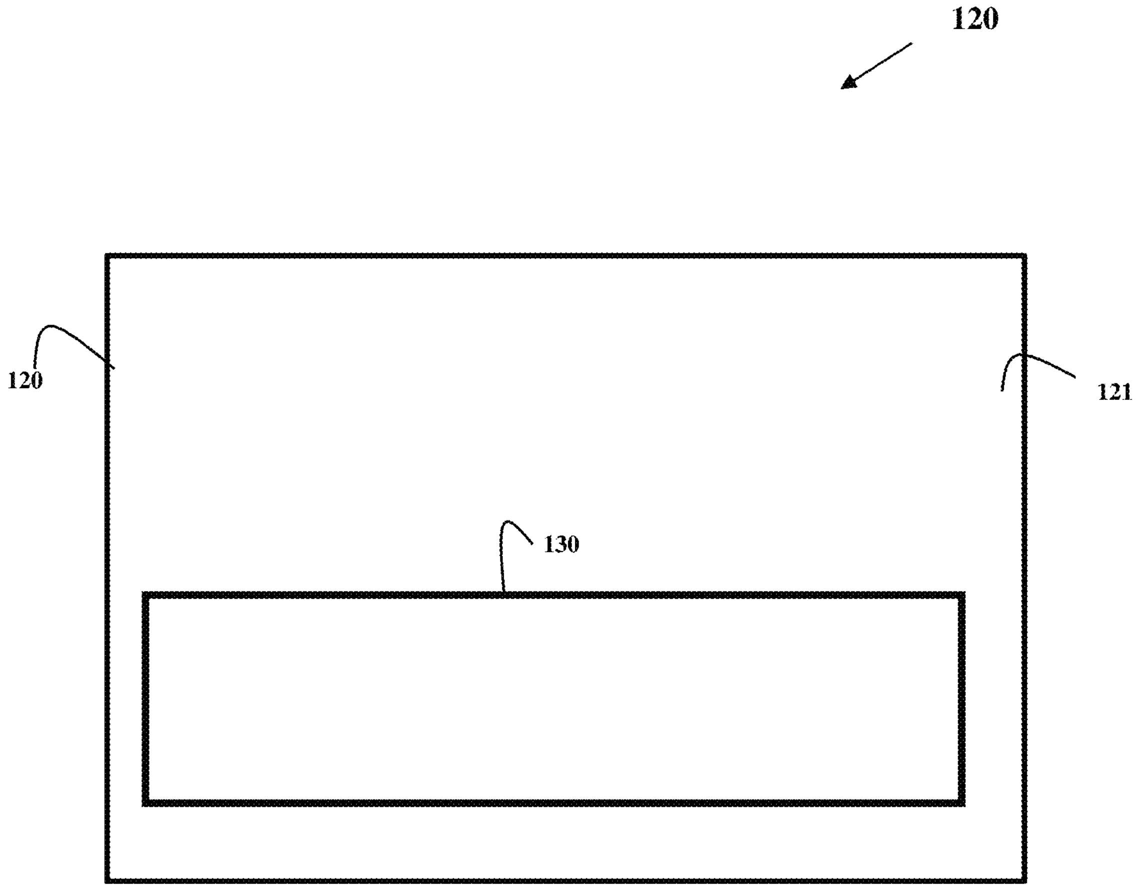
FIG. 2 is a diagram illustrating a primary label of the label combination separated from a liner of the label combination with the removable label, according to an example embodiment.

FIG. 2 is a diagram illustrating a primary label 120 of the label combination 100 separated from a liner 110 of the label combination 100 with the removable label 130, according to an example embodiment. The silicone patch 122 is not visible in FIG. 2 as it is under and behind the removable label 130.

Figure 3:
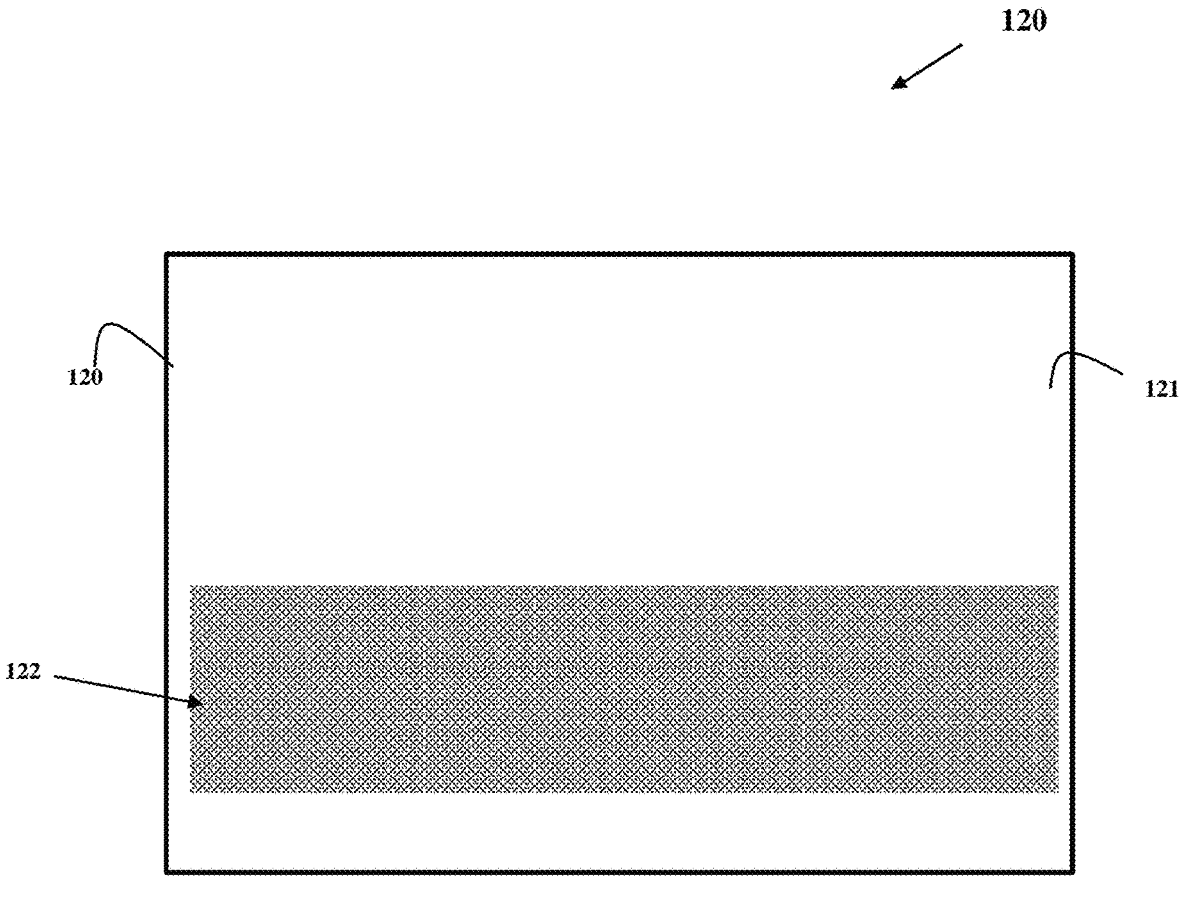
FIG. 3 is a diagram illustrating a primary label of the label combination separated from the liner of the label combination with the removable label separated and removed from the primary label, according to an example embodiment.

FIG. 3 is a diagram illustrating a primary label 120 of the label combination 100 separated from the liner 110 of the label combination 100 with the removable label 130 separated and removed from the primary label 120, according to an example embodiment. Notably, silicone patch 122 remains on the front side 121 of the primary label 120 after the removable label 130 is separated from the primary label 120.

Figure 4:
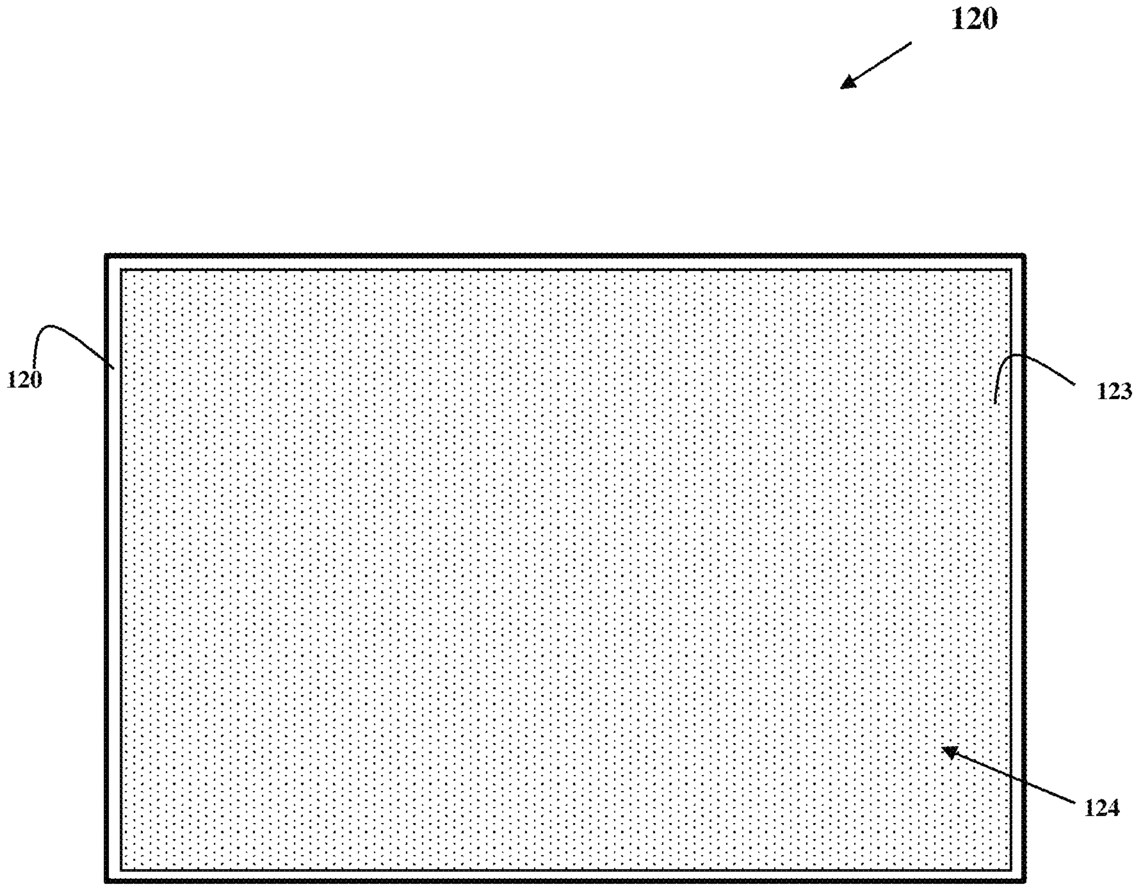
FIG. 4 is a diagram illustrating a backside of a primary label of the label combination, according to an example embodiment.

FIG. 4 is a diagram illustrating a backside 123 of a primary label 120 of the label combination 100, according to an example embodiment. The backside 123 of the primary label 120 includes an adhesive coating 124.

Figure 5:
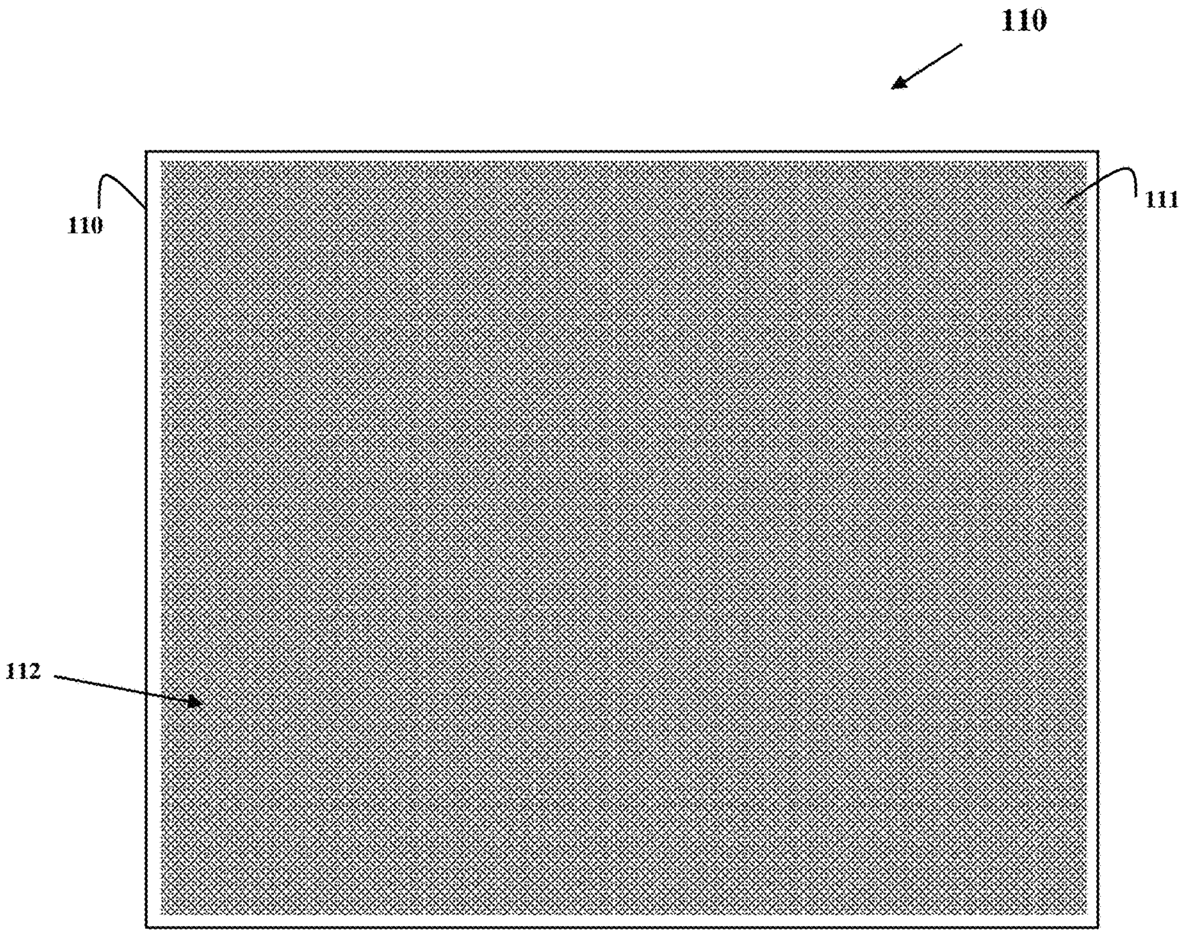
FIG. 5 is a diagram illustrating a front side of the liner of the label combination, according to an example embodiment.

FIG. 5 is a diagram illustrating a front side 111 of the liner 110 of the label combination 100, according to an example embodiment. The front side 111 of the liner 110 includes a release coating 112. This allows an auto applicator machine to separate the label combination 100 into the primary label 120 and the waste liner 110.

Figure 6:
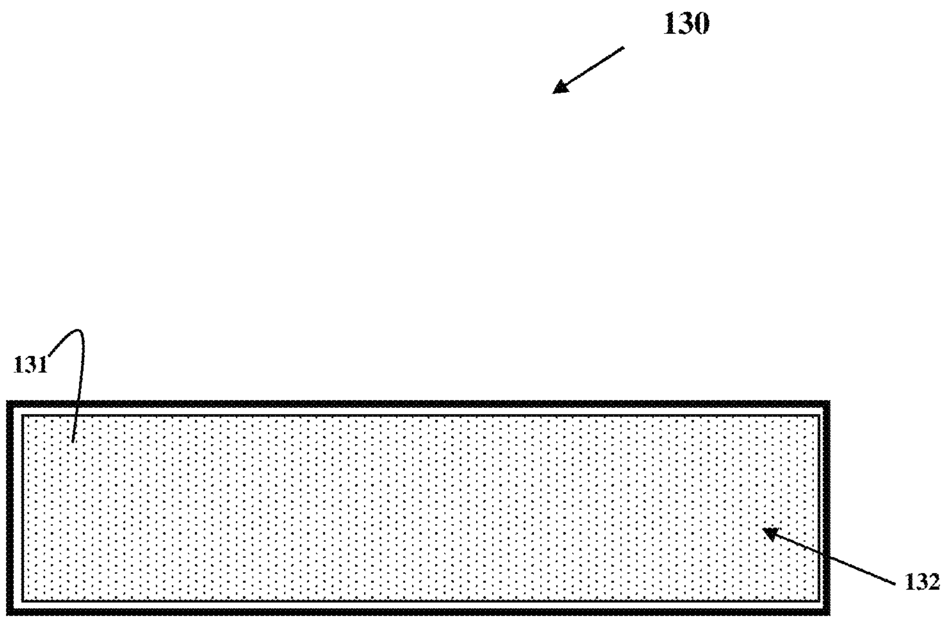
FIG. 6 is a diagram illustrating a backside of the removable label, according to an example embodiment.

FIG. 6 is a diagram illustrating a backside 131 of the removable label 130, according to an example embodiment. The backside 131 includes an adhesive coating 132.

In an embodiment, the front side 121 of primary label 120 and a front side of removable label 130 include a direct thermal activated coating or a thermal transfer coating. This permits a thermal printer to apply heat to surfaces of the front sides or to apply heat to a thermal ribbon resulting in custom indicia imaged on both the primary label 120 and the removable label 130.

In an embodiment, the front side 121 of primary label 120 and a front side of removable label include a dot matrix or label coating. This permits a dot matrix or laser printer to transfer ink onto surfaces of the front sides resulting in custom indicia printed on both the primary label 120 and the removable label 130.

In an embodiment, the release coating 112 on the front side 111 of the liner 110 is a same silicone release coating as the silicone release patch 122 on the front side 121 of primary label 120. In an embodiment, release coating 112 is a different release coating from the silicone release patch 122.

In an embodiment, the backside 131 of the removable label 130 is flood coated with the adhesive coating 132. In an embodiment, the backside 131 of the removable labels includes an adhesive coating applied as adhesive patches on portions, but not all, of the backside 131 of the removable label 130. In an embodiment, the adhesive patches are disposed on the backside 131 of the removable label 130 in predefined patterns.

In an embodiment, the front side 111 of liner 110 is flood coated with release coating 112. In an embodiment, the backside 123 of primary label 120 is flood coated with adhesive coating 124. In an embodiment, the backside 123 of primary label 120 includes an adhesive coating 124 applied as patches on portions, but not all, of the backside 123. In an embodiment, the adhesive patches disposed are disposed on the backside 123 of the primary label 120 in predefined patterns.

In an embodiment, the primary label 120 includes one or more additional silicone release patches 130 disposed on the front side 121 of the primary label 120. Each additional silicone release patch 130 includes a separate removable label 130 affixed atop a corresponding silicone release patch 130.

Figure 7:
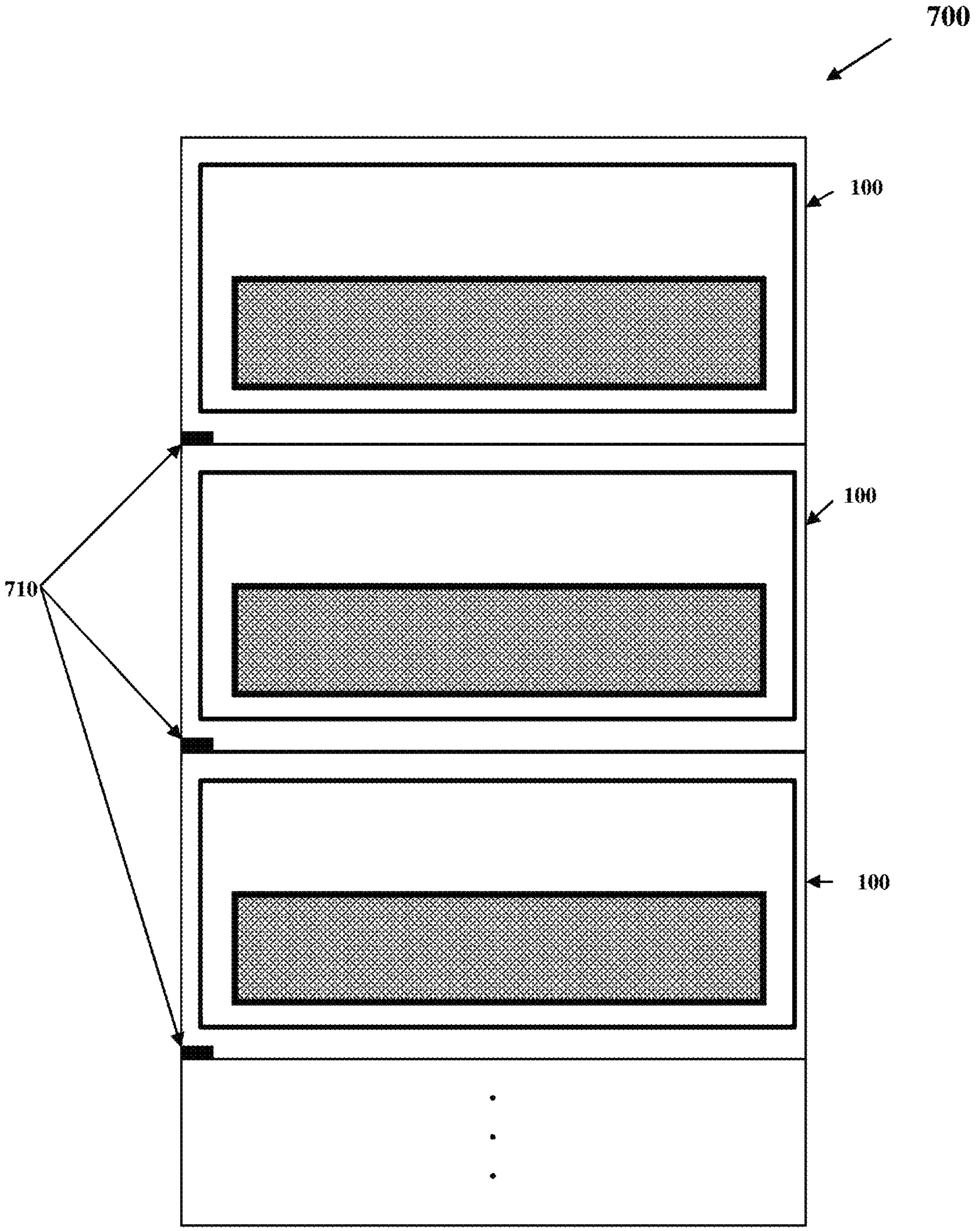
FIG. 7 is a diagram illustrating a roll of the label combinations, according to an example embodiment.

FIG. 7 is a diagram illustrating a roll 700 of the label combinations 100, according to an example embodiment. A web of substrates (label substrate 120 and liner substrate 110) are joined together as a roll 700 of the label combinations 100. Each individual label combination 100 identified via a sense mark 710 printed or imaged on the web. The sense marks 710 delineate each individual label combination 100 within the roll 700.

The roll 700 is shown unwound but is wound during manufacturing of the roll 700. The roll 700 adapted to be inserted into an auto applicator machine where each primary label 120 and removable label 130 of each label combination 100 is imaged/printed with custom indicia. When the auto applicator machine encounters a sense mark 710 an individual primary label 120 with the affixed corresponding removable label 130 is separated from the corresponding liner 110 and the primary label 120 is pressed onto a surface. As the auto applicator machine accumulates liner 110 separated from the corresponding primary label 120, the waste liner 110 is rewound into a waste liner roll. Because the waste liner 110 remains intact with no holes and with no waste liner breakage, the rewind process is balanced and smooth such that there are no jams in the auto applicator machine.

Figure 8:
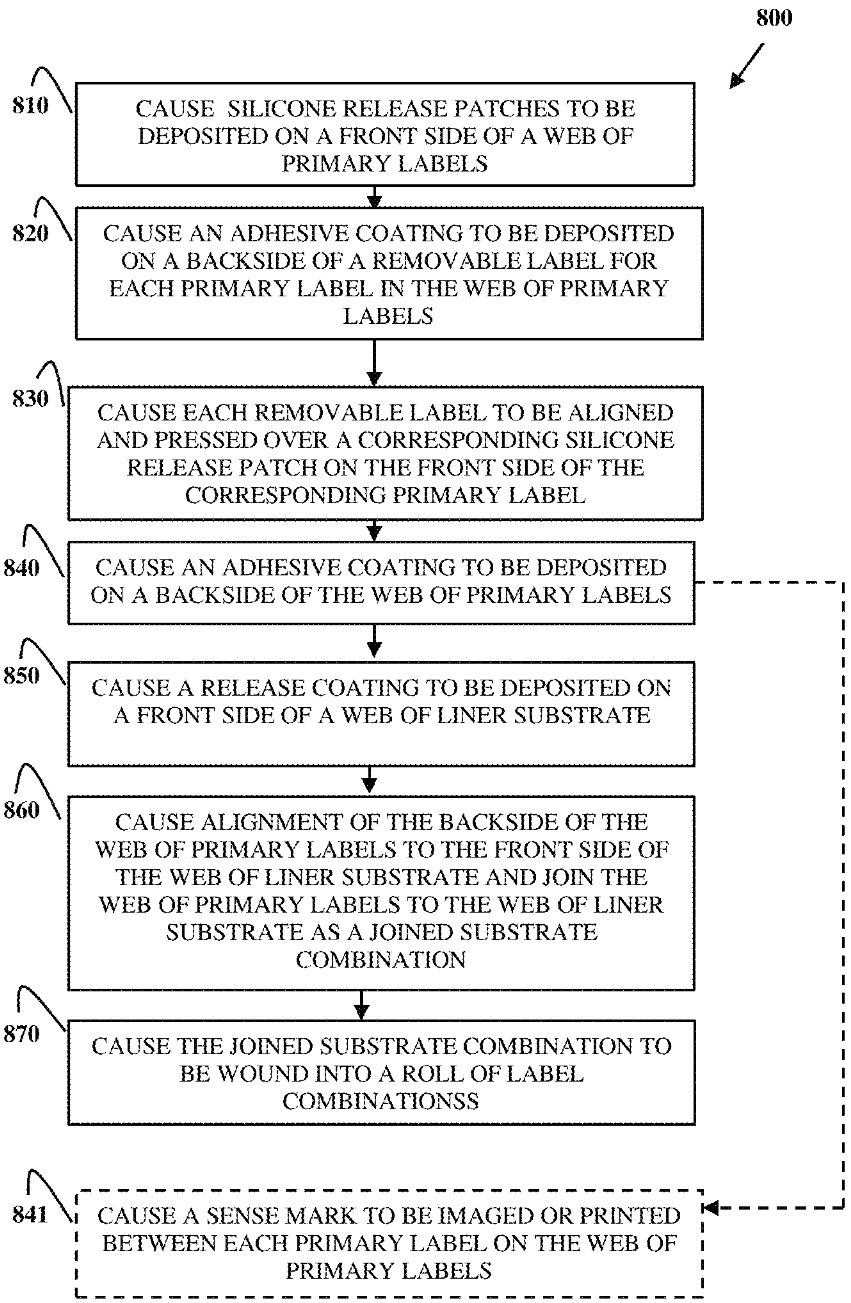
FIG. 8 is a flow diagram of a method for manufacturing a roll of liner combinations, according to an example embodiment.

FIG. 8 is a flow diagram of a method 800 of manufacturing a roll 700 of label combinations 100, according to an example embodiment. The method is implemented on a press through firmware that controls electro-mechanical components of the press to manufacture a roll of label combinations 100. A processor associated with the firmware/software executes instructions to perform the method 400 and to control the electromechanical components of stations of the press 200.

Each station of the press is associated with components for applying or depositing a given coating or applying the removable labels 130 to the corresponding primary labels of the roll 700. In an embodiment, the coatings at least include a silicone release patch 122, adhesive coatings 124 and 132, and release coating 112.

In an embodiment, a front side 121 of each primary label 120 and a front side of each removable label 130 includes a direct thermal or thermal transfer coating. In an embodiment, a front side 121 of each primary label 120 and a front side of each removable label includes a dot matrix or laser coating.

At 810, the processor of the press causes a silicone release patch 122 to be deposited on a front side 121 of a web of primary labels 120 (i.e., a web of label substrate).

At 820, the processor of the press causes an adhesive coating to be deposited on a backside 131 of a removable label 130 (i.e., removable label substrate) for each primary label 120.

At 830, the processor of the press causes each removable label 130 to be aligned and pressed over the corresponding silicone release patch on the front side of the corresponding primary label 120.

At 840, the processor of the press causes an adhesive coating to be deposited on backside 123 of the web of primary labels 120.

In an embodiment, at 841, the processor of the press causes a sense mark 710 to be imaged or printed between each primary label on the web of primary labels 120.

At 850, the processor of the press causes a release coating to be deposited on a front side 111 of a web of liner substrate 110 (i.e., liners 110).

At 860, the processor of the press causes alignment of the backside 123 of the web of primary labels 120 to the front side 111 of the web of liner substrate 110 and joins the web of primary labels 120 to the web of liner substrate 110 as a joined substrate combination.

At 870, the processor of the press causes the joined substrate combination to be would into a roll 700 of label combinations 100.

In an embodiment, the method 800 can be performed on the press by control of the processor in any order such that the order illustrated is one order of manufacture of various orders of manufacture. That is, the order illustrated is provided for purposes of illustration and practicing the method can be achieved in different orders without departing from the teachings provided herein.

Although the present invention is described with reference to certain preferred embodiments thereof, variations and modifications of the present invention can be affected within the spirit and scope of the following claims.

The invention claimed is:

1. A label combination, comprising:

a primary label defined on a label substrate;

a removable label defined on a removable label substrate; and a silicone release patch;

wherein the silicone release patch is disposed on a portion of a front side of the label substrate corresponding to the primary label;

wherein an adhesive is disposed on a backside of the removable label substrate corresponding to the removable label;

wherein the backside of the removable label substrate corresponding to the removable label is disposed over the silicone release patch on the front side of the label substrate corresponding to a portion of the primary label;

wherein the label combination is a piggyback label;

wherein the adhesive is disposed on a backside of the label substrate corresponding to the primary label;

wherein the adhesive is disposed as adhesive patches on the backside of the label substrate corresponding to the primary label.

2. A label combination, comprising:

a primary label defined on a label substrate;

a removable label defined on a removable label substrate; and a silicone release patch;

wherein the silicone release patch is disposed on a portion of a front side of the label substrate corresponding to the primary label;

wherein an adhesive is disposed on a backside of the removable label substrate corresponding to the removable label;

wherein the backside of the removable label substrate corresponding to the removable label is disposed over the silicone release patch on the front side of the label substrate corresponding to a the portion of the primary label;

wherein the label combination is a piggyback label;

a liner substrate;

a release coating disposed on a front side of the liner substrate;

an adhesive coating disposed on a backside of the label substrate;

wherein a backside of the label substrate corresponding to the primary label is disposed over and joined to the front side of the liner substrate.

3. A label combination, comprising:

a primary label defined on a label substrate;

a removable label defined on a removable label substrate; and a silicone release patch;

wherein the silicone release patch is disposed on a portion of a front side of the label substrate corresponding to the primary label;

wherein an adhesive is disposed on a backside of the removable label substrate corresponding to the removable label;

wherein the backside of the removable label substrate corresponding to the removable label is disposed over the silicone release patch on the front side of the label substrate corresponding to a the portion of the primary label;

wherein the label combination is a piggyback label;

one or more additional silicone release patches disposed on additional portions of the front side of the label substrate corresponding to the primary label;

wherein each additional silicone release patch associated with a separate removable label substrate affixed atop a corresponding additional silicone release patch.

4. The label combination of claim 1, wherein the removable label is adapted to separate from the primary label without any die cuts in the label substrate corresponding to the primary label.

5. The label combination of claim 1, wherein the adhesive patches are disposed in a pattern on the backside of the label substrate corresponding to the primary label.

6. The label combination of claim 5 further comprising:

a liner comprising a liner substrate; and a release coating flood coated on a front side of the liner substrate;

wherein the backside of the label substrate corresponding to the primary label is adhered to the front side of the liner substrate.

7. The label combination of claim 1, wherein the front side of the label substrate corresponding to the primary label and a front side of the removable label substrate corresponding to the removable label includes a direct thermal or thermal transfer coating disposed on the front side of the label substrate corresponding to the primary label and the front side of the removable label substrate corresponding to the removable label.

8. A roll of label combinations, comprising:

a web of a label substrate comprising primary labels;

a web of a liner substrate; and a plurality of removable label substrates, each removable label substrate defining one of a plurality of removable labels;

wherein portions of a front side of the web of the label substrate include silicone release patches disposed on the front side of web of the label substrate, wherein the web of the label substrate corresponding to each portion of a corresponding primary labels includes a corresponding removable label affixed atop a corresponding silicone release patch;

wherein a backside of the web of the label substrate is adhered or joined to a front side of the web of the liner substrate to form the roll of label combinations, each label combination comprising a corresponding primary label with a corresponding removable label affixed atop a corresponding silicone release patch;

wherein each label combination of the roll is a piggyback label;

wherein a backside of the web of the label substrate includes an adhesive coating, and wherein a front side of the web of the liner substrate includes a release coating.

9. The roll of label combinations of claim 8, further comprising sense marks imaged or printed along the web of the label substrate to delineate each individual label combination defined within the roll.

10. The roll of label combinations of claim 8, wherein a backside of each removable label substrate includes an adhesive coating.

* * * * *